United States Patent [19]
Ha et al.

[11] Patent Number: 6,166,788
[45] Date of Patent: Dec. 26, 2000

[54] DISPLAY MODULE HAVING LCD PANEL ATTACHED TO FRONT HOUSING HAVING AN OPENING, TO BE VISIBLE THROUGH THE OPENING

[75] Inventors: Woo-suk Ha; Sang-duk Lee; Chung-sub Oh; Jin-hyuk Park, all of Kyonggi-do, Rep. of Korea

[73] Assignee: Samsung Electronics Co., Ltd., Rep. of Korea

[21] Appl. No.: 09/074,106

[22] Filed: May 7, 1998

[30] Foreign Application Priority Data

Dec. 30, 1997 [KR] Rep. of Korea ............ 97-78227

[51] Int. Cl.[7] ................ G02F 1/1333; G02F 1/1335; G02F 1/1345
[52] U.S. Cl. .............. 349/58; 349/65; 349/150; 345/905
[58] Field of Search ............ 349/58, 65, 150; 345/87, 102, 905

[56] References Cited

U.S. PATENT DOCUMENTS

| | | | |
|---|---|---|---|
| 5,150,231 | 9/1992 | Iwamoto et al. | 359/44 |
| 5,548,306 | 8/1996 | Yates, IV et al. | 345/174 |
| 5,659,376 | 8/1997 | Uehara et al. | 349/58 |
| 5,710,607 | 1/1998 | Iwamoto et al. | 349/150 |
| 5,808,707 | 9/1998 | Niibori et al. | 349/60 |
| 5,949,642 | 9/1999 | Park | 361/681 |
| 6,067,133 | 5/2000 | Niibori et al. | 349/60 |

FOREIGN PATENT DOCUMENTS

| | | |
|---|---|---|
| 8-95005 | 4/1996 | Japan . |
| 10-20805 | 1/1998 | Japan . |

*Primary Examiner*—William L. Sikes
*Assistant Examiner*—Tarifur R. Chowdhury
*Attorney, Agent, or Firm*—Myers Bigel Sibley & Sajovec

[57] ABSTRACT

A lighter and thinner LCD module wherein a mold frame, a back cover and a top chassis are removed by directly attaching a back light assembly to a rear case and an LCD panel and a driving circuit unit to a front case.

41 Claims, 5 Drawing Sheets

DISPLAY MODULE HAVING LCD PANEL ATTACHED TO FRONT HOUSING HAVING AN OPENING, TO BE VISIBLE THROUGH THE OPENING

BACKGROUND OF THE INVENTION

1. Field of the Invention

The present invention relates to a display module and, more particularly, to a thinner and lighter display module wherein a front case on which an LCD panel and a driving circuit unit are mounted is coupled with a rear case on which a back light assembly is directly installed, and thereby a top chassis, a back cover and a mold frame which are used in a conventional display module can be removed.

2. Description of the Related Art

With a great supply of personal computers (PC), notebook PCs employing an LCD as a displaying unit are widely favored and the demand therefor is on the explosive increase. The notebook PCs have smaller portable sizes and can be used without a separate power supply because it can be operated with a storage battery installed therein.

The notebook PC is designed to have peripheral devices of a desk top PC, e.g., a CD-ROM, a modem and a speaker, therein. With the development in the LCD fabricating technology, larger monitors for the notebook PCs are realized. At present, approximately 13" diagonal size LCD panels are employed in the notebook PCs. This is a sketchbook size beyond the notebook size, i.e., an A4 paper size.

As the size of the monitor increases, the whole size and weight of the notebook PC also increase. As a result, the notebook PCs are losing its portable feature. Most notebook PCs have a thickness of 40 mm and a weight of 2 to 3 Kg. With a larger monitor, the weight of the notebook PC may become beyond that.

The display part of the notebook PC including an LCD module and a plastic case have a weight of up to 500 to 700 g which occupies a considerable portion in the whole weight of the notebook PC.

Referring to FIG. 1, a conventional LCD module will be described more in detail.

As shown in FIG. 1, the conventional LCD module includes: a back light assembly 5 to 9; a plastic mold frame 25 in which the back light assembly is settled; an LCD panel including upper and lower substrates 10 and 11; a driving circuit unit 1 to 4 for driving the LCD panel; and a top chassis 24 for protecting the driving circuit unit. The LCD module is installed in a plastic case with front and rear plastic cases 21 and 22.

The back light assembly is composed of a light guide plate 6; a reflector sheet 7 attached to the bottom of the light guide plate 6; a series of overlying sheets 5 attached to the top of the light guide plate 6, for diffusing and concentrating light; a lamp 8 installed at an end of the light guide plate 6; and a lamp cover 9 installed around the lamp 8.

When light is supplied from the lamp 8, the light is guided by the light guide plate 6, reflected by the reflector sheet 7, diffused and concentrated through the series of overlying sheets 5, and transmitted to the LCD panel 10.

For stability of the structure, the conventional LCD module has a double cased structure including the top chassis 24 and the plastic mold frame 25 which serve basically the same function. This results in increased weight. Accordingly, the weight and thickness of the notebook PC employing such an LCD module cannot be reduced.

SUMMARY OF THE INVENTION

It is therefore an object of the present invention to provide a thinner and lighter display module by improving the structure thereof.

To achieve the above object and other advantages, the display module according to the present invention comprises: a front case including an opening formed at the center portion thereof; an LCD panel directly attached to the front case using an adhesive material; a driving circuit unit mounted on the LCD panel by tape automated bonding (TAB) technology; a rear case coupled with the front case; a back light assembly; and a supporting and fixing unit which is formed integrally with the rear case, for supporting and fixing said back light assembly.

The supporting and fixing means comprises: a supporting and fixing unit for supporting a lamp assembly; and a supporting and fixing unit for supporting a light guide assembly.

According to the present invention, a lamp cover of the lamp assembly is accommodated in a groove. The ends of the lamp cover are fixed by means of a projection or a boss. For example, one end of the lamp cover is fixed by means of the projection and the other end thereof is fixed by means of the boss using a bolt. Alternatively, both of the ends of the lamp cover are fixed by means of the bosses using bolts.

In addition, according to the present invention, the lamp assembly supporting and fixing unit comprises: a rib pattern formed by protruding the bottom of the rear case and having a size corresponding to the light guide assembly; a plurality of projections formed on the bottom of the rear case corresponding to the four corners of the light guide assembly; and a light guide assembly holder for fixing the light guide assembly.

For example, the rib pattern includes: a first rib formed corresponding to the edge portions of the light guide assembly; second ribs formed in the rectangle of the first rib at predetermined intervals as a concentric circle pattern or a rectangle pattern; and third ribs formed radially crossing the second ribs. The first, the second and the third ribs are interconnected.

Preferably, the ribs are arranged at predetermined intervals and have a rectangular cross-section.

In addition, the rib pattern has a height that is gradually increased from a portion thereof that is close to the lamp assembly of the light guide assembly. As a result, the top surface of the rib pattern is flush with the top surface of the light guide assembly when the light guide assembly is settled on the rib pattern.

The projections of the light guide assembly supporting and fixing unit include: first projections for preventing the light guide assembly from being moved to right and left; and at least one second projection for preventing the light guide assembly from being moved to front and rear and to right and left. Preferably, the second projections have an angular C shape with an opening toward the light guide assembly. Furthermore, the light guide assembly includes a tap formed by protruding a portion thereof corresponding to the second projection, for being fitted into the groove formed by the second projection.

Preferably, the projections have a height that is smaller than the sum of the thickness of the light guide assembly and the height of the rib pattern at the same position.

The light guide assembly holder according to an embodiment of the present invention includes: a body having an angular C shape with an opening toward the lamp assembly; and a tap formed by protruding the body, for fixing to the rear case.

Preferably, the light guide assembly holder further includes a flange formed by extending the inner edge portion of the body as a single body, for maintaining a predetermined space.

The light guide assembly supporting and fixing unit according to another embodiment of the present invention includes: a light guide assembly holder formed by protruding the rear case upwardly to a predetermined height; and a spacer attached to the bottom of the LCD lower panel corresponding to the light guide assembly holder.

Preferably, the spacer has a larger width than the holder.

In addition, the light guide assembly holder includes a bottom having a thickness that is gradually increased from a portion thereof that is close to the lamp assembly of the light guide assembly.

Preferably, the rear case is formed of a Mg alloy and the rear case is formed by die casting.

The driving circuit unit includes: a row drive printed circuit board that is mounted on the LCD panel by tape automated bonding (TAB) technology using a tape carrier package; and a column drive printed circuit board that is mounted on the LCD panel by TAB technology using a tape carrier package.

According to the present invention, the column drive printed circuit board includes a plurality of stacked printed circuit boards with an adhesive member between them and the stacked printed circuit boards are connected to respective one of separated ends of an interface flexible printed circuit (FPC).

In addition, a driving IC of the tape carrier package that is TAB-mounted on the column drive printed circuit board is opposed to the bottom of the front case. A groove for accommodating a portion of the driving IC is formed in the front case.

Preferably, the column and the row drive printed circuit boards are attached to the bottom of the front case using an adhesive buffering member. The adhesive buffering member includes an epoxy thermoplastic resin or a rubber with two sides coated with an adhesive material.

The driving IC of the tape carrier package that is TAB-mounted on the row drive printed circuit board is opposed to the bottom of the rear case.

BRIEF DESCRIPTION OF THE DRAWINGS

The above object and other advantages of the present invention will become more apparent by describing in detail the preferred embodiments thereof with reference to the accompanying drawings, in which.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those having skill in the art.

According to the present invention, an LCD module is mainly divided into a back light assembly, an LCD panel and a driving circuit unit connected to the LCD panel. The back light assembly is directly mounted on a rear case. The LCD panel and the driving circuit unit connected to the LCD panel are directly mounted on a front case. Thereby, a mold frame, a back cover and a top chassis which are used in a conventional display module are removed.

Accordingly, the structure of the rear case and the back light assembly fabricated together and the structure of the front case, the LCD panel and the driving circuit unit fabricated together will be separately described. Both of the structures are not necessarily applied to a single display module. With either of the structures, the weight and thickness of the display module are reduced compared with the conventional display module including the mold frame, the back cover and the top chassis. Preferably, both of the structures are applied to the display module.

Figure 2:
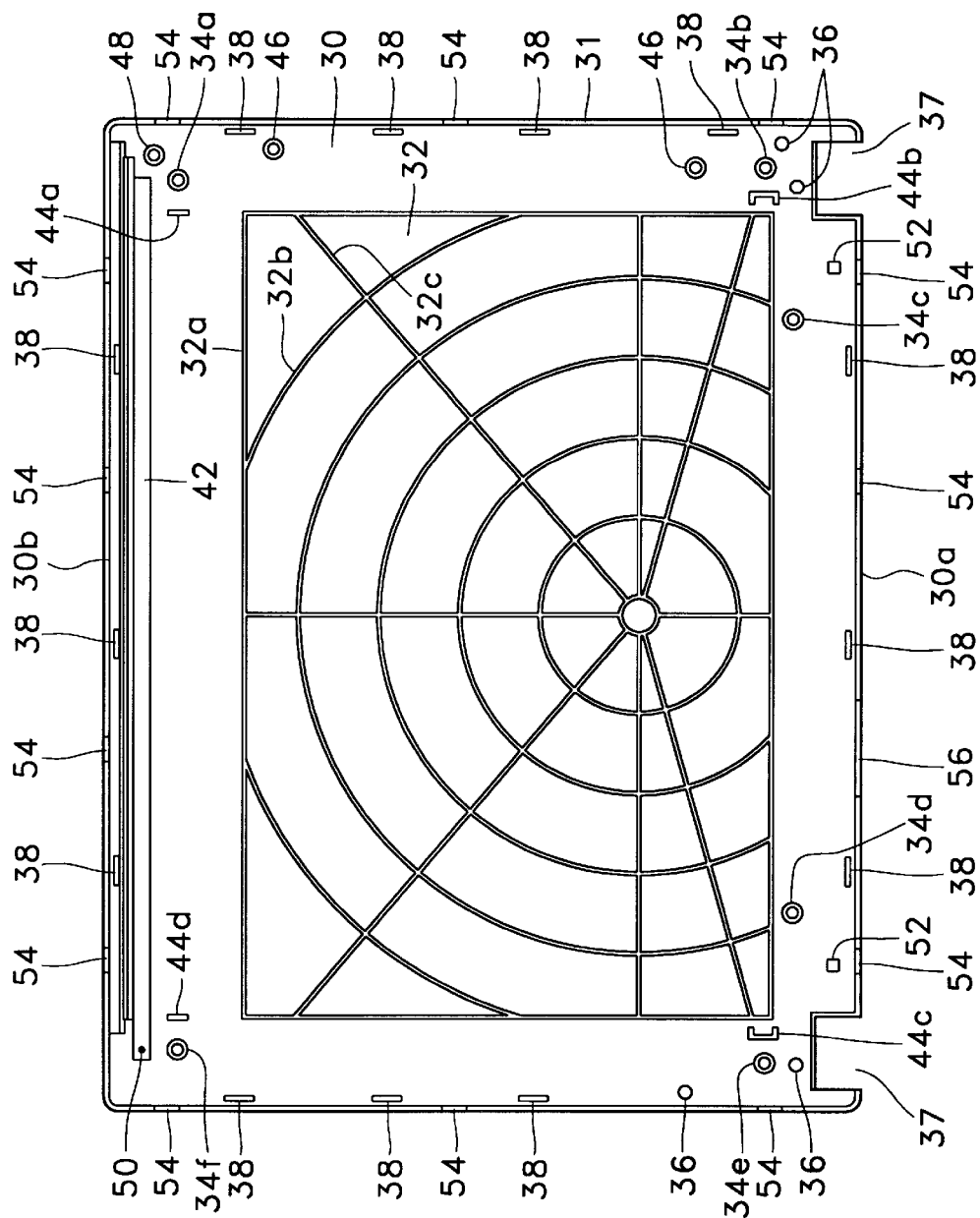
FIG. 2 is a top view of a rear case including a rib pattern according to the present invention.
Figure 4:
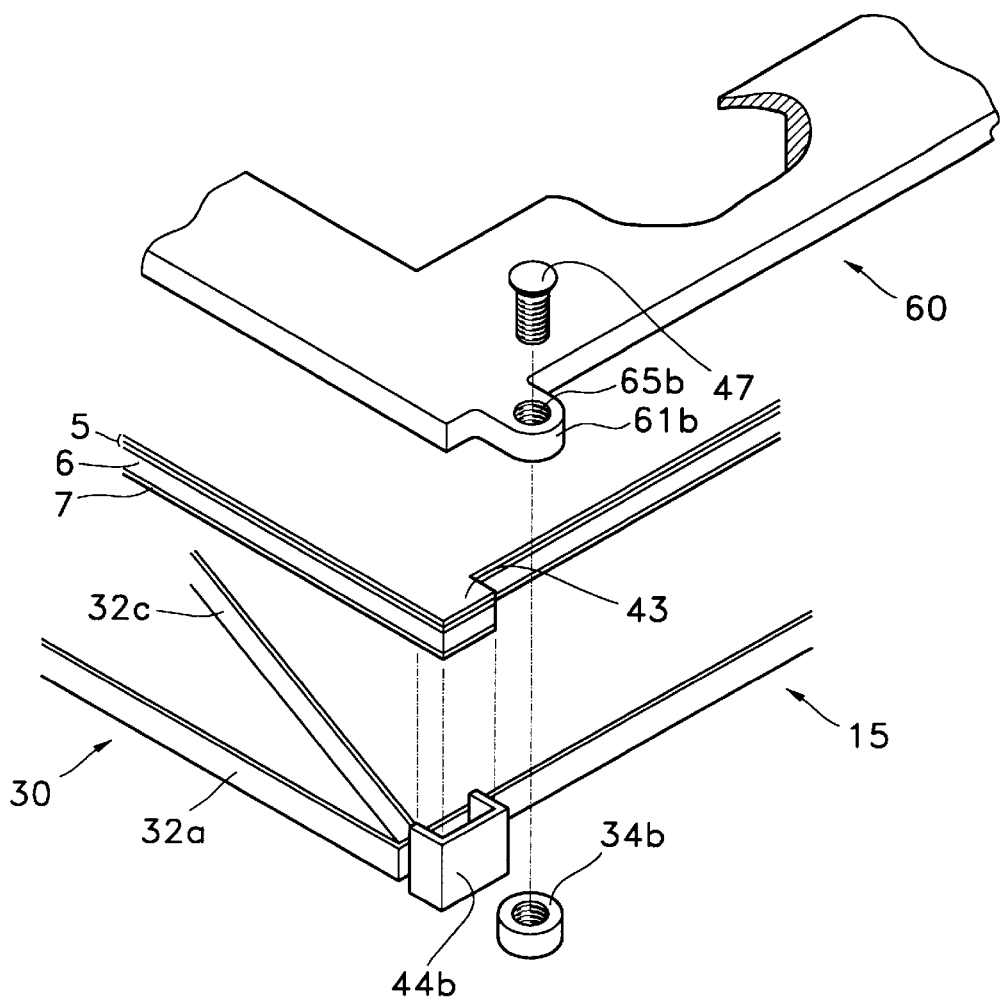
FIG. 4 is an exploded perspective view of an embodiment of a light guide assembly and a rear case according to the present invention.
Figure 5:
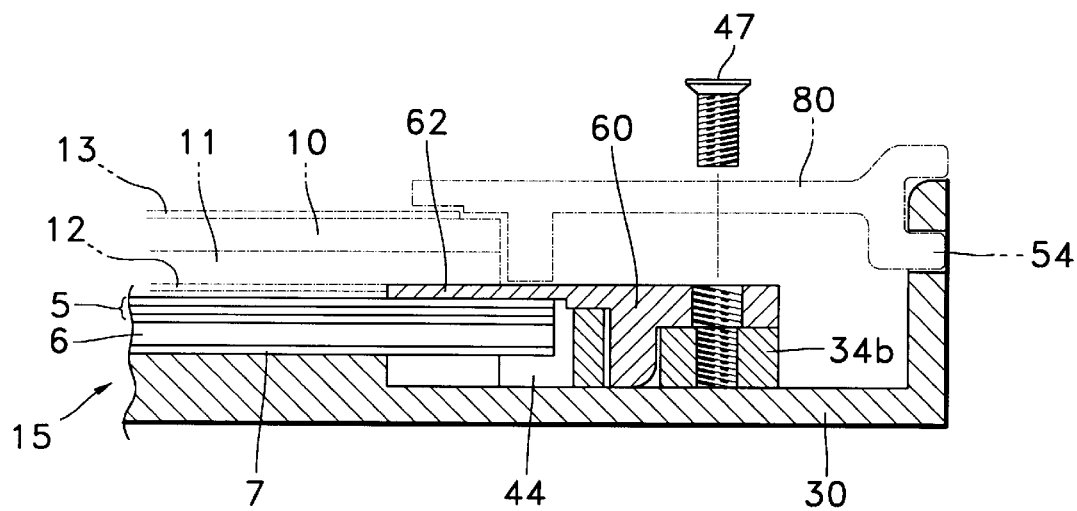
FIG. 5 is a cross-sectional view of a light guide assembly and a rear case fabricated together according to the present invention.

Referring to FIG. 2, the structure of the back light assembly and the rear case fabricated together will be described. For description purposes, the back light assembly is composed of a lamp assembly and a light guide assembly. The light guide assembly is composed of a light guide plate and a series of overlying sheets.

The rear case 30 applied to the present invention needs to satisfy several conditions so that the back light assembly can be directly installed thereon. The rear case 30 needs to have high resistance against external impact and high efficiency in emitting heat from a lamp.

For the characteristics, the rear case 30 may be formed of a Mg alloy which has a higher resistance against external impact and higher efficiency in emitting heat compared with a general resin. The rear case 30 includes a variety of bosses, ribs and openings which are integrally formed through die casting.

The rear case 30 includes sidewalls 31 which is integrally formed along the edges thereof. Grooves 37 are formed in the front portion of the rear case 30. Bosses 36 are formed integrally with the rear case 30 at the front portion thereof. The grooves 37 and the bosses 36 are used when the rear case 30 is hinged on the body of the notebook PC by means of hinges (not shown).

Holes 54 are formed in the sidewalls 31 formed along the edges of the rear case 30. Guide projections 38 are formed integrally with the rear case 30 in spaced apart relation by a predetermined distance from the sidewalls 31. The holes 54 and the guide projections 38 are used when the rear case 30 is coupled with the front case.

A rib pattern 32 is formed integrally with the bottom of the rear case 30. The rib pattern 32 is brought in contact with the light guide assembly and subject to direct external impact. Accordingly, it is desirous that the rib pattern 32 is formed as a shape capable of providing high resistance against external impact.

According to this embodiment, a rib 32a is formed along the sidewalls 31 as a rectangular shape. In the rectangular rib 32a, ribs 32b are formed as concentric circles at predetermined intervals. Ribs 32c are formed radially crossing the ribs 32b. As a result, external impact can be uniformly dispersed through the rib pattern 32 including the ribs 32a, 32b and 32c which are formed like a spider's web. The ribs 32b are formed as concentric circles in the embodiment. They may be, however, modified as radially arranged rectangles.

The intervals between the ribs 32a, 32b and 32c provide rapid emission of heat from the lamp. In addition, the ribs 32a, 32b and 32c have a rectangular cross-section and thereby can contact with the light guide assembly by larger portions thereof. This results in stable installation of the light guide assembly.

Figure 3:
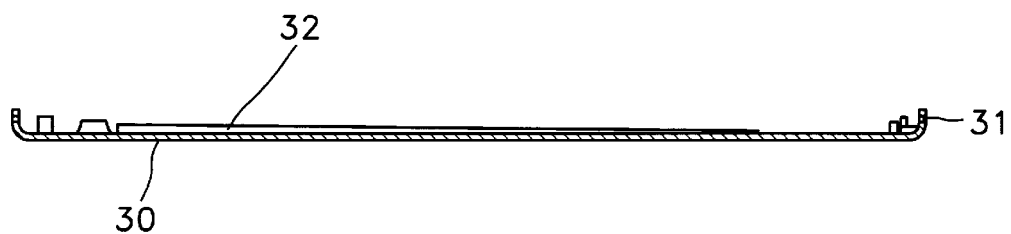
FIG. 3 is a cross-sectional view of a rear case including a rib pattern according to the present invention.

Preferably, the height of the rib pattern 32 is gradually reduced or increased. In other words, the thickness of the light guide assembly is gradually reduced from the portion thereof that is close to the lamp. On the other hand, the height of the rib pattern 32 in contact with the light guide assembly is gradually increased in inverse proportion to the thickness of the light guide assembly. As shown in FIG. 3, the rib pattern 32 has a height that is gradually increased from the portion thereof that is close to a groove 42 for insertion of the lamp cover. Thus, when the light guide assembly is fabricated with the rear case 30, the whole thickness can be maintained uniformly.

A plurality of bosses 34a, 34b, 34c, 34d, 34e, and 34f are formed integrally with the rear case 30 around the rib pattern 32. Four projections 44a, 44b, 44c and 44d for correct placement are also formed integrally with the rear case 30 at positions thereof corresponding to the four corners of the rib pattern 32. According to this embodiment, the projections 44b and 44c located on the front portion have an angular C shape and the projections 44a and 44d located on the rear portion have an 1 shape. The bosses 34a, 34b, 34c, 34d, 34e and 34f are used for fixing a light guide assembly holder to the rear case 30. The projections 44a, 44b, 44c and 44d are used for correct placement of the light guide assembly on the rib pattern 32. Placement of the light guide assembly on the rib pattern 32 will be described more in detail when the light guide assembly holder is described. Preferably, the projections 44a, 44b, 44c and 44d have a height that is smaller than the sum of the thickness of the light guide assembly and the height of the rib pattern at the same position.

Reference numeral 52 represents spacers for maintaining spaced apart relation between the rear case and the front case. Reference numeral 46 represents a boss form fixing an inverter thereto. Reference numerals 48 and 50 represent a boss and a projection for fixing the lamp cover thereto, respectively. Reference numeral 56 represents a groove for passage of a cable.

Referring to FIGS. 2 through 5, installation of the back light assembly on the rear case according to the present invention will be described.

Figure 1:
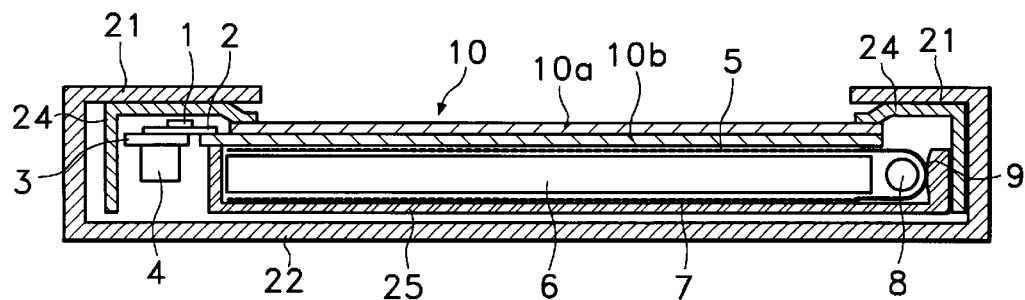
FIG. 1 is a cross-sectional view of a conventional display module.

First, the lamp cover 9 as shown in FIG. 1 is inserted into the groove 42 as shown in FIG. 2. At this time, an end portion of the lamp cover 9 is fitted onto the projection 50 and the other end portion thereof is fixed to the boss 48 by means of a bolt. Both of the end portions may be fixed to bosses 48 by means of bolts.

Thereafter, a reflector sheet, a light guide plate, and a series of overlying sheets of the light guide assembly are installed in order on the rib pattern 32 of the rear case 30. As aforementioned, the height of the rib pattern 32 is gradually increased from the portion thereof that is close to the lamp assembly, and the thickness of the light guide assembly is gradually reduced from the portion thereof that is close to the lamp assembly. As a result, the whole thickness when the light guide assembly is installed on the rear case 30 is maintained uniformly. The light guide plate 6 is formed of an acrylic resin having a thickness of 0.5 to 1.0 mm in which a material having characteristics of a high transmission and a high scatter is added.

In addition, the light guide assembly is correctly placed by the projections 44a, 44b, 44c and 44d. The movements of the light guide assembly to right and left are limited by the projections 44a and 44d formed at the rear portion of the rear case 30 and the movements thereof to right and left and to front and rear are limited by the projections 44b and 44c formed at the front portion of the rear case 30. Taps 43 for correct placement are formed at the front end portions of the light guide assembly, i.e., the reflector sheet 7, the light guide plate 6 and the series of overlying sheets 5. The taps 43 are fitted into the grooves formed by the projections 44b whereby the light guide assembly can be accurately placed with respect to the lamp assembly.

Thereafter, a holder 60 for holding the light guide assembly is installed.

Figure 6:
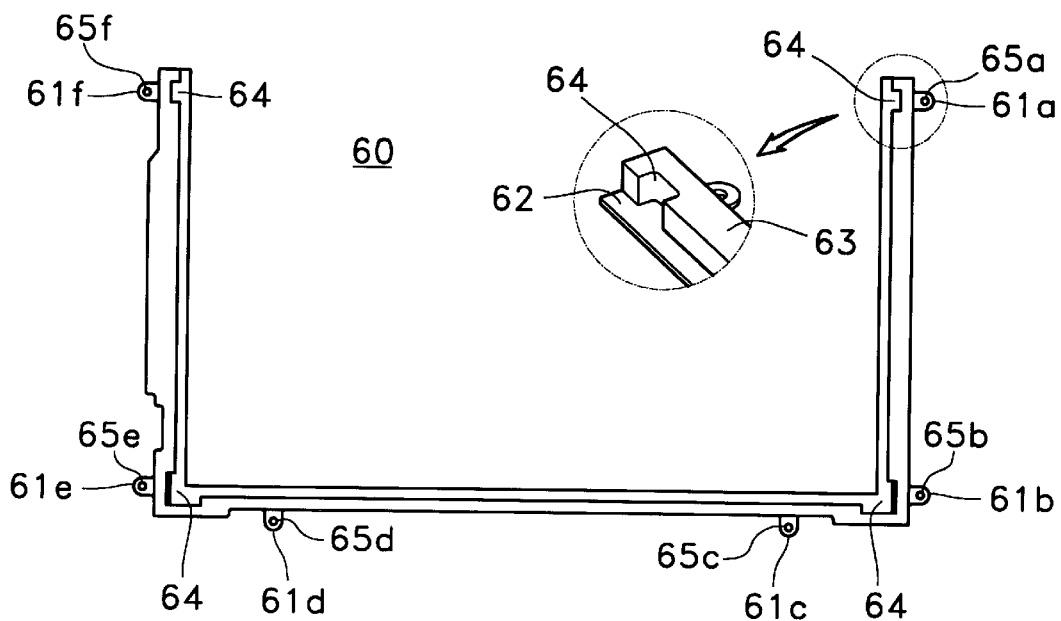
FIG. 6 is a top view of a light guide assembly holder according to the present invention.

As shown in FIG. 6, the light guide assembly holder 60 is formed as an angular C shape with an opening toward the lamp assembly.

Taps 61a, 61b, 61c, 61d, 61e and 61f for fixing the holder 60 to the rear case 30 are formed at edge portions of the holder 60. The taps 61a, 61b, 61c, 61d, 61e and 61f correspond to the bosses 34a, 34b, 34c, 34d, 34e, and 34f, respectively. The inner sides of the taps 61a through 61f include a spiral groove. Recesses 64 are formed in the holder 60. The projections 44a, 44b, 44c and 44d are accommodated in the recesses 64.

Preferably, a flange 62 is integrally formed with the holder 60 along the inner edges thereof. The flange 62 is located between the lower LCD panel 11 and the overlying sheets 5 so that a predetermined space can be maintained for the lower polarizing plate 12 and the overlying sheets 5.

The holder 60 is installed by screwing a bolt 47 into the tap 61b and the boss 34b, successively. As aforementioned, a predetermined space can be maintained between the light guide assembly and the LCD panel and the fabrication efficiency can be enhanced by fitting the taps 43 of the light guide assembly into the grooves formed by the projections 44a, 44b, 44c and 44d and installing the holder.

Thereafter, an inverter is fixed to the boss 46 by means of a bolt. The input connector of the lamp assembly is connected to the output connector of the inverter.

As a result, the back light assembly is fixedly installed on the rear case 30. On the other hand, the LCD panel 10, 11, 12 and 13 and the driving circuit unit are installed on the front case 80. The front case 80 with the LCD panel 10, 11, 12 and 13 and the driving circuit unit installed thereon is coupled with the rear case 30 by means of the holes 54 and the guide projections 38.

The fabrication of the LCD panel, the driving circuit unit and the front case will be described referring to FIGS. 7 and 8.

Figure 7:
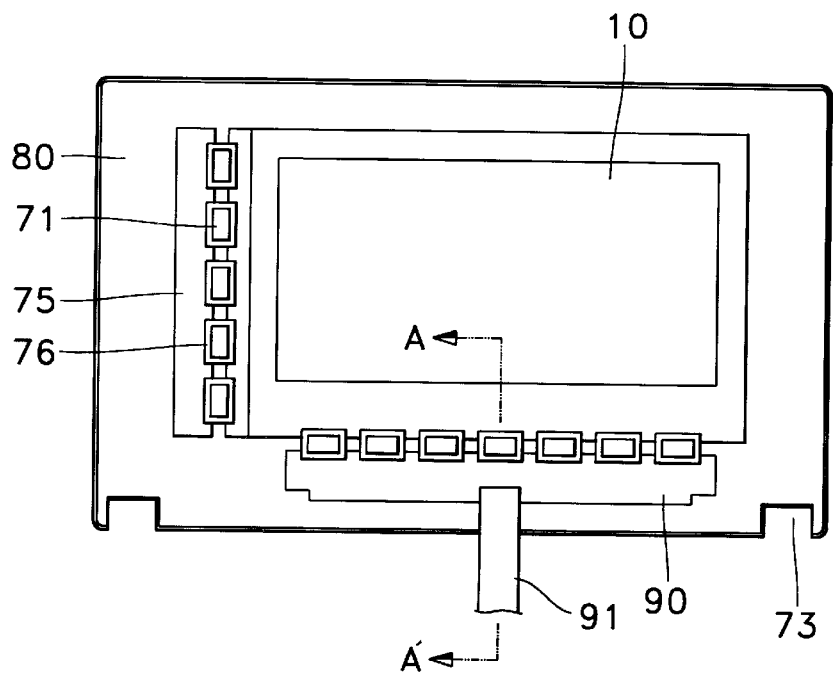
FIG. 7 is a top view of a front case according to the present invention.
Figure 8:
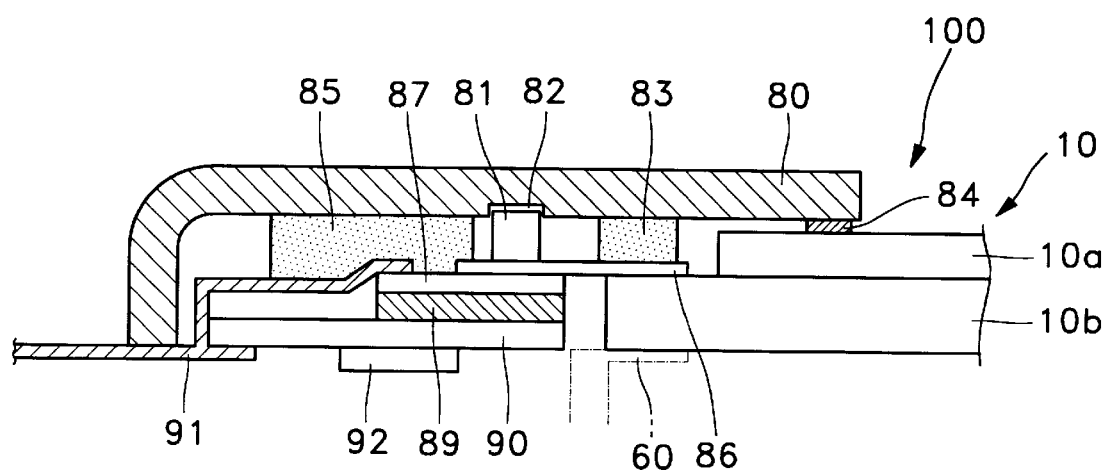
FIG. 8 is a cross-sectional view taken along lines A–A' of FIG. 7.

FIG. 7 is a top view of the LCD panel, the driving circuit unit and the front case which are fabricated together. FIG. 8 is a cross-sectional view taken along lines A–A' of FIG. 7.

As illustrated, an opening 100 is formed at the center of the front case 80. A two-sided adhesive tape 84 is attached to the bottom of the front case 80 along the inner edge of the opening 100. The upper edge portion of the upper LCD panel 10 is attached to the front case 80 by means of the two-sided adhesive tape 84.

A column drive printed circuit board 87 is mounted on the LCD lower panel 11 by tape automated bonding (TAB) technology using tape carrier packages 86. The column drive printed circuit board 87 with the tape carrier packages 86 is mounted thereto is attached to the bottom of the front case 80 using an adhesive buffering material 85. Preferably, the tape carrier package 86 attached to the LCD lower panel 11 is also attached to the bottom of the front case 80 using an adhesive buffering material 83. The adhesive buffering materials 83 and 85 provide mechanical stability of the column drive circuit unit. The adhesive buffering materials 83 and 85 may be epoxy thermoplastic resin or rubber including two sides coated with an adhesive material.

An interface printed circuit board 90 is attached to the column drive printed circuit board 87 by means of a two-sided adhesive tape 89. Accordingly, the column drive printed circuit board 87 and the interface printed circuit board 90 have a sandwiched structure with the tape 89 between them. In addition, an interface flexible printed circuit (FPC) 91 is electrically connected to the column drive printed circuit board 87 and the interface printed circuit board 90 in such a manner that one end of the interface FPC 91 is separated in two and the two separated ends of the interface FPC 91 are connected to the column drive printed circuit board 87 and the interface printed circuit board 90, respectively.

Preferably, a groove 82 is formed in the bottom of the front case 80. A driving IC 81 of the tape carrier package 86 is accommodated in the groove 82 and is not brought in contact with the front case 80 when the column drive printed circuit board 87 and the tape carrier package 86 are attached to the front case 80. A voltage generator, a DC—DC voltage transducer, a timing controller and the like which are indicated by reference numeral 92 are installed on the interface printed circuit board 90.

Similar to the column drive printed circuit board 87, a row drive printed circuit board 75 is also mounted on the LCD lower panel 11 by TAB technology using tape carrier packages 76 and attached to the front case using adhesive buffering materials 83 and 85.

The fabrication of the front case, the LCD panel and the driving circuit unit will be briefly described.

First, the column drive printed circuit board 87 and the interface printed circuit board 90 are respectively connected to separated ends of the interface FPC 91. Components are automatically mounted on the column drive printed circuit board 87 and the interface printed circuit board 90 under the condition that the interface FPC 91 is spread.

The row drive printed circuit board 75 is mounted on an end portion of the LCD lower panel 11 by TAB technology using a tape carrier package 86. The column drive printed circuit board 87 is mounted on another adjacent end portion of the LCD lower panel 11 by TAB technology using the tape carrier package 76.

The two-sided adhesive tape 84 is attached to the bottom of the front case 80 along the opening 100 of the front case 80. The TAB-mounted LCD panel 10 and 11 is attached to the front case 80.

At this time, the printed circuit boards 87 and 75 and the driving ICs 81 and 71 of the tape carrier packages 86 and 76 are subject to mechanical impact. Accordingly, it is desirous to attach the printed circuit boards 87 and 75 and the tape carrier packages 86 and 76 to the bottom of the front case 80 using the adhesive buffering materials 83 and 85 which capable of preventing the printed circuit boards 87 and 75 from being damages by mechanical impact. In addition, a sufficient space can be obtained between the driving ICs 81 and 71 and the front case 80 by forming the grooves 82 for accommodating the driving ICs 81 and 71 in the front case at the positions corresponding to the driving ICs 81 and 71. As a result, the driving ICs 81 and 71 can be prevented from being mechanically damaged which otherwise occur when the driving ICs 81 and 71 are brought in contact with the front case 80.

Thereafter, the interface printed circuit board 90 is attached to the column drive printed circuit board 87 using the two-sided adhesive tape 89. Accordingly, the column drive printed circuit board 87 and the interface printed circuit board 90 have a sandwiched structure with the tape 89 between them. This stacked structure can considerably reduce the size of the printed circuit board compared to a single layered structure of the column drive printed circuit board.

In this embodiment, the inverter is described as fixed to the boss 46 of the rear case 30 by means of the bolt. It is apparent, however, that the inverter can be attached to the bottom of the front case 80 using a two-sided adhesive tape or an adhesive material of epoxy thermoplastic resin.

Then, the display module is completely fabricated by coupling the front case 80 on which the LCD panel and the driving circuit unit are installed with the rear case 30 on which the back light assembly is installed. When the front case 80 is coupled with the rear case 30, the interface FPC 91 is outputted from the display module through the groove 56 of the rear case 30.

Figure 9:
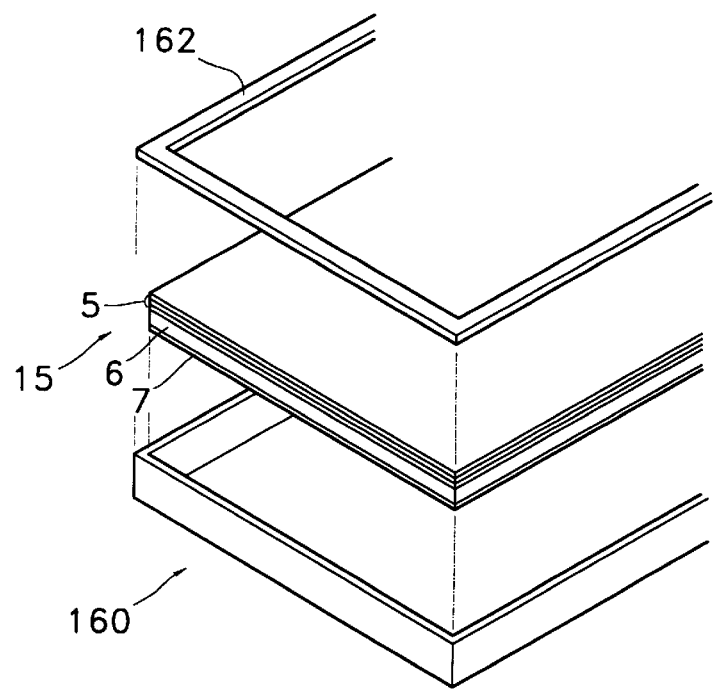
FIG. 9 is an exploded perspective view of another embodiment of a light guide assembly and a rear case fabricated together according to the present invention.

FIG. 9 is a perspective view of another embodiment of the light guide assembly holder 160 according to the present invention.

As shown in FIG. 9, the light guide assembly holder 160 is formed as an angular C shape with an opening toward the lamp assembly. Preferably, the holder 160 is formed integrally with the bottom of the rear case 30.

Preferably, the thickness of the bottom of the holder 160 is gradually increased from the portion thereof that is close to the lamp assembly. That is the depth of the holder 160 becomes gradually shallower. The gradually increased thickness of the bottom of the holder 160 or gradually reduced depth of the holder 160 can be obtained by processing the bottom of the rear case 30 or by separately forming the holder 160 to have such a bottom and attaching the holder 160 to the rear case 30. For a thinner display module, it is desirous that the bottom of the rear case 30 is processed. Alternatively, the rib pattern having gradually changed height may be formed on the bottom of the holder 160.

In addition, a spacer 162 having the same angular C shape as the holder 160 is located on the holder 60 to maintain a predetermined space for the light guide assembly 5, 6 and 7. Preferably, the spacer 162 may be formed of a silicon cushion. In addition, preferably, the spacer 162 has a little larger width than the holder 160 so that the spacer 162 can limit the up and down movements of the light guide assembly 5, 6 and 7.

The fabrication of the embodiment of the light guide assembly will be described.

First, the light guide assembly is inserted into the holder 160. The holder 162 has a depth that is almost the same as the thickness of the light guide assembly. In addition, the light guide assembly has a gradually reduced thickness and the holder has a gradually increased depth in inverse proportion to the thickness of the light guide assembly. Accordingly, the top surface of the holder is flush with the upper surface of the light guide assembly when the light guide assembly is settled in the holder 160.

The fabrication of the display module is then completed by coupling the front case with the rear case. In other words, the spacer 162 is attached to the bottom of the LCD lower panel 11 in advance. Then, the spacer 162 is settled corresponding to the holder 160 when the front case is coupled with the rear case. Particularly, since the spacer 162 has a larger width than the holder 160, the spacer 162 can limits the movements of the light guide assembly. Accordingly the up and down movements of the light guide assembly can be prevented and a sufficient space can be maintained between the light guide assembly and the LCD lower panel 11.

As aforementioned, the present invention has several advantages.

First, the light guide assembly is directly installed on the rear case using a holder without a mold frame, which results in reduced weight and thickness.

In addition, the rear case is formed of a Mg alloy and particularly, the light guide assembly is supported by the rib pattern structure, which provides rapid heat emission and high resistance against external impact.

The light guide assembly is fixed using the holder and a sufficient space is maintained between the LCD panel and the light guide assembly, which results in easy fabrication.

In addition, the LCD panel is directly attached to the front case without using a top chassis, which results in reduced weight and size. The tape carrier packages are attached to the front case using an adhesive buffering material and thereby the tape carrier packages can be protected from being damaged by mechanical impact from the front case.

The row drive printed circuit board is formed in stacked structure including a plurality of printed circuit boards, which results in reduced mounting area and size.

This invention has been described above with reference to the aforementioned embodiments. It is evident, however, that many alternative modifications and variations will be apparent to those having skill in the art in light of the foregoing description. Accordingly, the present invention embraces all such alternatives, modifications and variations as fall within the spirit and scope of the appended claims.

What is claimed is:

1. An LCD module for an electronic device, comprising:
   a front housing including an opening formed at a center portion thereof;
   a rear housing coupled with said front housing to form an enclosure, said rear housing comprising:
      opposite first and second end portions; and
      means for supporting a back light assembly within said enclosure, said back light assembly supporting means integrally formed with said rear housing;
   an LCD panel enclosed within said front and rear housings, said LCD panel attached to said front housing so as to be visible through said opening;
   a driving circuit unit attached to, and in electrical communication with, said LCD panel; and
   the back light assembly enclosed within said front and rear housings and attached to said rear housing via said back light assembly supporting means.

2. An LCD module according to claim 1, wherein said back light assembly comprises:
   a lamp assembly including a lamp cover; and
   a light guide assembly.

3. An LCD module according to claim 2 wherein said back light assembly supporting means comprises:
   means for supporting said lamp assembly; and
   means for supporting said light guide assembly.

4. An LCD module according to claim 3, wherein said lamp assembly supporting means comprises:
   a groove comprising opposite first and second ends formed within said rear housing adjacent said rear housing first end portion, said groove configured to receive said lamp cover therewithin; and
   a pair of projections extending from said rear housing adjacent said respective first and second ends of said groove, said projections configured to secure said lamp cover thereto.

5. An LCD module according to claim 4, further comprising hinge grooves formed in said rear housing second end portion.

6. An LCD module according to claim 3, wherein said light guide assembly supporting means comprises:
   ribs extending from said rear housing, said ribs having a size corresponding to a size of said light guide assembly;
   a plurality of projections extending from said rear housing, each of said projections corresponding to a respective corner of said light guide assembly; and
   a light guide assembly holder.

7. An LCD module according to claim 6, wherein said ribs comprise:
   a first rib comprising a generally rectangular shape, said first rib including a side portion that corresponds with respective edge portions of said light guide assembly;
   a plurality of second ribs formed into a concentric pattern within said rectangular shape of said first rib;
   a plurality of third ribs substantially transverse to said second ribs; and
   wherein said first, second and third ribs are interconnected.

8. An LCD module according to claim 7, wherein said concentric pattern of second ribs is a circular concentric pattern.

9. An LCD module according to claim 7, wherein said concentric pattern of second ribs is a rectangular concentric pattern.

10. An LCD module according to claim 7, wherein said first, second and third ribs comprise a substantially rectangular cross-section.

11. An LCD module according to claim 6, wherein said ribs have a height extending from said rear housing that gradually increases in a direction from said rear housing first end portion towards said rear housing front end portion.

12. An LCD module according to claim 6, wherein said plurality of projections comprises:
   a plurality of first projections that prevent lateral movement of said light guide assembly in a first direction; and
   at least one second projection that prevents lateral movement of said light guide assembly in a second direction transverse to said first direction.

13. An LCD module according to claim 12, wherein said at least one second projection comprises a C-shaped configuration.

14. An LCD module according to claim 13, wherein said light guide assembly comprises at least one tab extending therefrom that is configured to engage said at least one second projection.

15. An LCD module according to claim 12, wherein, at a first location between said rear housing first and second end portions, said projections each have a height less than a sum of a thickness of said light guide assembly and said rib pattern at said first location.

16. An LCD module according to claim 6, wherein said light guide assembly holder comprises:
- a body having a C-shaped configuration with an outer peripheral portion and an inner peripheral portion; and
- a plurality of tabs extending outwardly from said body outer peripheral portion, said tabs configured to secure said light guide assembly holder to said rear housing via a plurality of bosses extending from said rear housing.

17. An LCD module according to claim 16, wherein said light guide assembly holder further comprises a flange extending outwardly from said body inner peripheral portion, said flange configured to maintain a predetermined space between portions of said light guide assembly.

18. An LCD module according to claim 17, wherein said light guide assembly holder has a tapered thickness that gradually increases in a direction extending away from a portion thereof that is adjacent said lamp assembly.

19. An LCD module according to claim 1, wherein said LCD module rear housing is formed from a lightweight material having high heat emission characteristics and high resistance to mechanical impacts.

20. An LCD module according to claim 1, wherein said rear housing is formed of a magnesium alloy.

21. An LCD for an electronic device, comprising:
- a front housing including opposite top and bottom sides and an opening formed therethrough at a center portion of said front housing;
- a rear housing coupled with said front housing to form an enclosure, said rear housing comprising:
  - opposite first and second end portions; and
  - means for supporting a back light assembly within said enclosure, said back light assembly supporting means integrally formed with said rear housing;
- an LCD panel enclosed within said front and rear housings, said LCD panel attached to said front housing so as to be visible through said opening;
- a driving circuit unit attached to, and in electrical communication with, said LCD panel, said driving unit comprising:
  - a row drive printed circuit board mounted on said LCD panel via a tape carrier package; and
  - a column drive printed circuit board mounted on said LCD panel via a tape carrier package; and
- the back light assembly enclosed within said front and rear housings and attached to said rear housing via said back light assembly supporting means.

22. An LCD module according to claim 21, wherein said column drive printed circuit board includes a plurality of stacked printed circuit boards with an adhesive member between said plurality of stacked printed circuit boards.

23. An LCD module according to claim 22, wherein said adhesive member includes a two-sided adhesive tape.

24. An LCD module according to claim 22, wherein each of said stacked printed circuit boards is connected to respective bifurcated end of an interface flexible printed circuit.

25. An LCD module according to claim 21, wherein a driving integrated circuit of said tape carrier package is mounted on said column drive printed circuit board in opposing relationship with said bottom side of said LCD module front housing.

26. An LCD module according to claim 25, wherein said LCD module front housing includes a groove for accommodating a portion of said driving integrated circuit.

27. An LCD module according to claim 21, wherein said column and said row drive printed circuit boards are attached to said bottom of said LCD module front housing using an adhesive buffering member.

28. An LCD module according to claim 27, wherein said adhesive buffering member comprises an epoxy thermoplastic resin with two sides coated with an adhesive material.

29. An LCD module according to claim 28, wherein said adhesive buffering member comprises rubber with two sides coated with an adhesive material.

30. An LCD module according to claim 21, wherein a driving integrated circuit of said tape carrier package is mounted on said row drive printed circuit board in opposing relationship with said bottom side of said LCD module front housing.

31. An LCD module according to claim 21, further comprising hinge grooves formed in said LCD module front housing.

32. An LCD module according to claim 31, wherein said column drive printed circuit board is mounted to said LCD module front housing bottom side adjacent said hinge grooves.

33. An LCD module for an electronic device, comprising:
- a front housing including opposite top and bottom sides and an opening formed therethrough at a center portion of said front housing;
- a rear housing coupled with said front housing to form an enclosure, said rear housing comprising:
  - opposite first and second end portions; and
  - means for supporting a back light assembly within said enclosure, said back light assembly supporting means integrally formed with said rear housing;
- an LCD panel enclosed within said front and rear housings, said LCD panel attached to said front housing so as to be visible through said opening;
- a driving circuit unit attached to, and in electrical communication with, said LCD panel, said driving unit comprising:
  - a row drive printed circuit board mounted on said LCD panel via a tape carrier package; and
  - a column drive printed circuit board mounted on said LCD panel via a tape carrier package; and
- the back light assembly enclosed within said front and rear housings and attached to said rear housing via said back light assembly supporting means, said back light assembly comprising:
  - a lamp assembly including a lamp cover; and
  - a light guide assembly.

34. An LCD module according to claim 33 wherein said back light assembly supporting means comprises:
- means for supporting said lamp assembly, comprising:
  - a groove comprising opposite first and second ends formed within said rear housing adjacent said rear housing first end portion, said groove configured to receive said lamp cover therewithin; and
  - a pair of projections extending from said rear housing adjacent said respective first and second ends of said groove, said projections configured to secure said lamp cover thereto; and
- means for supporting said light guide assembly, comprising:

a web-like pattern of ribs extending from said rear housing, said rib pattern having a size corresponding to a size of said light guide assembly;

a plurality of projections extending from said rear housing, each of said projections corresponding to a respective corner of said light guide assembly; and a light guide assembly holder.

35. An LCD module according to claim 34, wherein said web-like pattern of ribs comprises:

a first rib comprising a generally rectangular shape, said first rib including a side portion that corresponds with respective edge portions of said light guide assembly;

a plurality of second ribs formed into a concentric pattern within said rectangular shape of said first rib;

a plurality of third ribs substantially transverse to said second ribs; and wherein said first, second and third ribs are interconnected.

36. An LCD module according to claim 35, wherein said concentric pattern of second ribs is a circular concentric pattern.

37. An LCD module according to claim 35, wherein said concentric pattern of second ribs is a rectangular concentric pattern.

38. An LCD module according to claim 34, wherein said web-like pattern of ribs comprises a height extending from said rear housing that gradually increases in a direction from said rear housing first end portion towards said rear housing front end portion.

39. An LCD module according to claim 34, wherein said light guide assembly holder comprises:

a body having a C-shaped configuration with an outer peripheral portion and an inner peripheral portion; and a plurality of tabs extending outwardly from said body outer peripheral portion, said tabs configured to secure said light guide assembly holder to said rear housing via a plurality of bosses extending from said rear housing.

40. An LCD module according to claim 39, wherein said light guide assembly holder further comprises a flange extending outwardly from said body inner peripheral portion, said flange configured to maintain a predetermined space between portions of said light guide assembly.

41. An LCD module according to claim 40, wherein said light guide assembly holder has a tapered thickness that gradually increases in a direction extending away from a portion thereof that is adjacent said lamp assembly.

* * * * *